Nov. 24, 1931.  A. C. HARRISON  1,833,077
CONTROL METHOD AND APPARATUS
Original Filed July 7, 1924
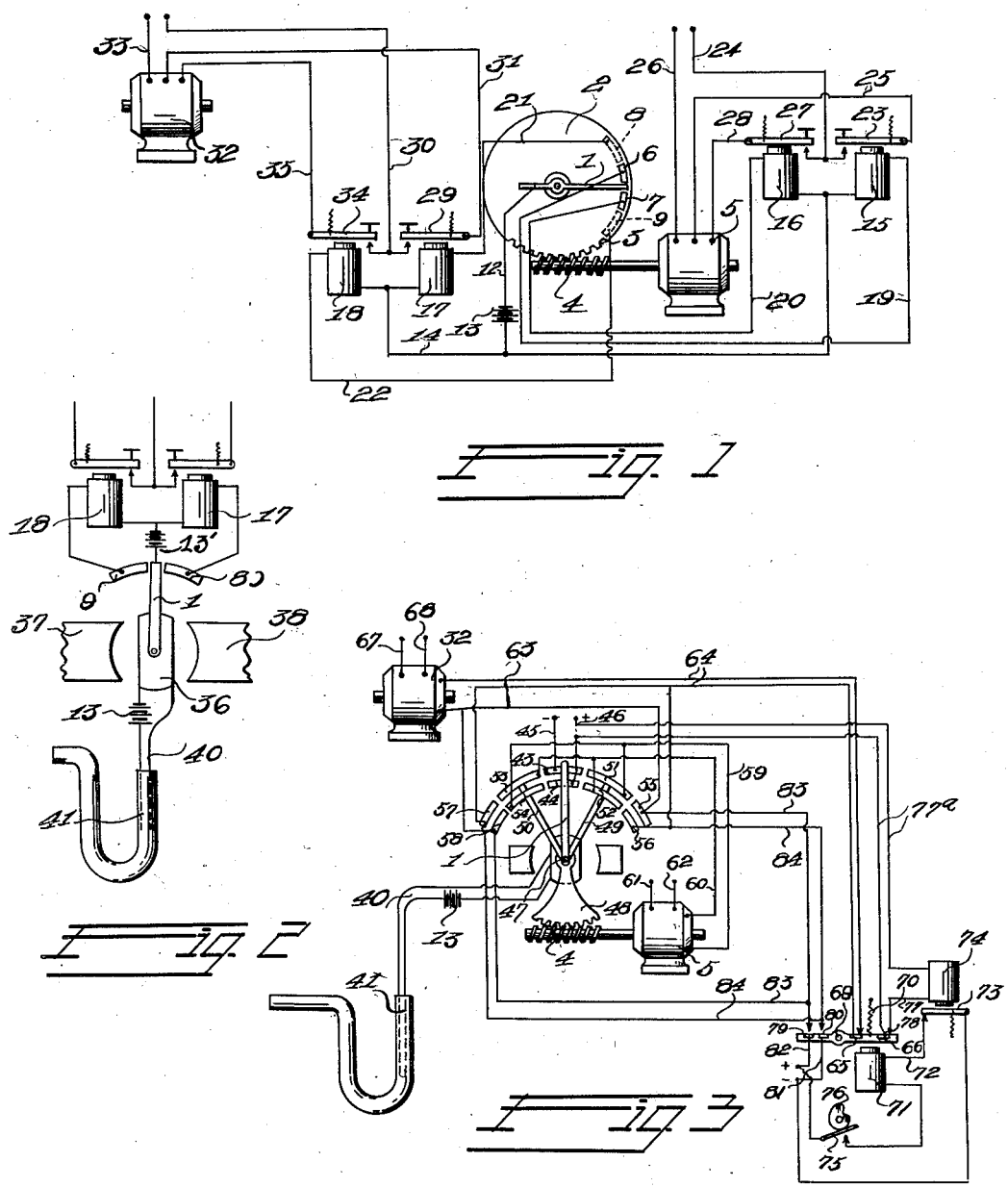
Inventor
Archibald C. Harrison
William A. Strauch
Attorney Patented Nov. 24, 1931

1,833,077

UNITED STATES PATENT OFFICE

ARCHIBALD C. HARRISON, OF ALEXANDRIA, VIRGINIA, ASSIGNOR TO THE BROWN INSTRUMENT COMPANY, OF PHILADELPHIA, PENNSYLVANIA

CONTROL METHOD AND APPARATUS

Original application filed July 7, 1924, Serial No. 724,630. Divided and this application filed November 16, 1927. Serial No. 233,727.

My invention relates to automatic control methods and apparatus therefor.

More particularly, my invention relates to methods of and apparatus for controlling various conditions such as for example, regulation of temperature and the like.

Maintenance of conditions such as furnace temperature at predetermined values has been heretofore obtained by control apparatus which operate periodically and in response to departure of temperature or condition from the predetermined value and actuate a condition varying agent to bring a temperature or condition back to the predetermined value.

In adjusting a heat energy supply or a condition varying agent responsive to such deviations from the desired temperature or condition, the control apparatus as heretofore ordinarily arranged continues to make corrections to the condition varying agent as long as the temperature or condition is off the normal or predetermined value even though the temperature is approaching its correct value. Excessive corrections are therefore often made and as a result the temperature or condition tends to rise above the desired normal or predetermined value. Thereupon adjustment of the condition varying agent is made in the opposite direction resulting in the same over shooting of the temperature or condition but in the opposite direction. This oscillation of the temperature or condition known as hunting produces wider deviations from normal than is permissible in many practical operations such for example as in the control of tubular oil cracking stills wherein it is required that the temperature be maintained very close to the desired temperature at all times in order to produce a uniform grade of gasoline.

In one method which has been developed for overcoming hunting the control apparatus is so practised as to make heat supply corrections of smaller amounts than is necessary to restore the furnace to the normal temperature condition. By providing long intervals between each correction so as to permit the temperature to again become stabilized for the new rate of fuel supply before making the succeeding corrections, overshooting of the temperature is prevented. This has the disadvantage, however, of being very slow, and therefore of maintaining the temperature off normal for long periods of time and is therefore not practical in relations where corrections of the temperature must be made as quickly as possible after the temperature varies from the predetermined value. This method of hunting elimination has therefore substantially the same disadvantage as hunting itself.

Various other methods and mechanisms have been developed to minimize hunting. One type of prior mechanism predetermines the rate of return to normal by the employment of an escapement device. In such arrangements, an estimate is made of the approximate rate of return of the temperature for a rate of fuel supply and the escapement mechanism is operated to establish a predetermined rate of approach to normal in an effort to prevent overshooting the normal. A serious disadvantage of such arrangements is its excessive complication in structure and operation. Such mechanism is not only involved and complicated, but generally subject to the inherent disadvantages of being less flexible on account of the return to normal taking place at a predetermined rate.

I have invented a simple and effective apparatus for fulfilling the required conditions without the employment of more complicated and expensive apparatus which may more readily get out of order. In order to maintain a condition accurately at a predetermined value not only must the corrections be made in accordance with the extent of departure of the condition from a predetermined value but also in accordance with the directions to which the condition is deviating, that is away from or towards normal condition. A condition such as temperature which has deviated from normal but is gradually approaching the normal value, may attain this value without any further change of the fuel supply whereas if the temperature is off normal to the same extent and tends to remain so or to vary still further from the normal, a change in the heat energy supply is required in order to bring the temperature back to normal. Therefore the variations in heat energy supply must be made not only in accordance with the extent of departure but also in accordance with the direction of variations of the temperature at the instant when the correction is made.

I have found it possible to so arrange control apparatus that selective operations are carried out in accordance with the direction of deviation of a controlled condition with relation to a predetermined or normal value, that a control can be obtained in which a large correction is made when the condition is drifting away from the predetermined value and a comparatively smaller correction is made when the condition is drifting toward normal and at the same time making the corrections in accordance with the same extent of deviation from normal. The correction accordingly, depends not only on the extent of deviation but also on whether the drift is from or towards the predetermined value at the instant the correction is made. It will be noted further that the return to normal is not predetermined and bound by an escapement return, but is entirely dependent upon the conditions existing at the time of the operation. The control apparatus functions in a variable manner depending entirely on the rate of approach, as distinguished from the escapement return mechanism which returns at a predetermined rate.

Accordingly, an object of my invention is to provide a method of and apparatus for selectively controlling a condition in accordance with the direction of movement or drift of a deflecting member either away from or towards a neutral position.

Another object of my invention is to provide means for varying a supply of heat energy in accordance with the extent of departure from a predetermined temperature and in accordance with the direction of temperature variations.

I have found that as the deflecting member of a galvanometer control mechanism will either be moving further from its neutral position, remaining fixed, or moving towards its neutral position, when deviations of the controlled condition occur in accordance with whether the condition moves away from its predetermined value, remains fixed or moves towards its predetermined value, selective corrections can be made not only in accordance with the extent of deflection but also in accordance with the direction of movement of the deflecting member. Therefore another object of my invention is to provide means for providing a selective control mechanism in accordance with the direction of movement of a deflecting member from or towards its neutral position.

Another object of my invention is to provide means for controlling a condition varying agent differently when a deflecting member is moving away from than when it is moving towards its neutral position.

Still another object of the invention is to render the deflecting member periodically operative.

Other objects of my invention are such as may be attained by a utilization of the various combinations, subcombinations and principles hereinafter set forth and as defined by the terms of the appended claims.

As shown in the drawings:

Figure 1 is a diagram of the circuits and control apparatus employed in carrying out one form of my invention.

Figure 2 is a diagram of the circuits and apparatus for a simple control operation.

Figure 3 is a diagram of modified circuits and apparatus for carrying out my invention.

Referring to Figure 1, a novel form of motor control is provided which may be used to regulate valves in response to pressure variations or temperature changes and which is adaptable to processes in which appreciable time elapses from the operation of the valve controlling motor and the time when the change takes place.

A deflecting arm member 1 is arranged to be deflected in accordance with a variation from a predetermined condition of pressure or temperature in any well known manner as for example under control of a galvanometer operated by currents from a thermocouple in combinations with a periodic member as illustrated in application Serial No. 48,687, filed August 6, 1925.

Mounted for rotation about the axis of rotation of arm 1 but movable independently thereof is a disk 2. A set of teeth 3 is cut into the periphery of disc 2 and mesh with a drive worm 4 which in turn is driven by a well known type of reversing motor 5.

Supported on disc 2 are contacts 6 and 7 which are arranged to be engaged by arm 1 when the pressure or temperature being measured varies from a predetermined value to deflect arm 1. Contacts 8 and 9 are secured to fixed supports (not shown) adjacent to disc 2 and in position to be engaged respectively by contacts 6 and 7 when disc 2 is rotated by motor 5. Arm 1 is connected by conductor 12 to one terminal of battery 13. The other terminal of battery 13 is connected by a conductor 14 to terminals of electromagnetic switches or relays 15, 16, 17 and 18. The remaining terminals of these relays are connected respectively by conductors 19, 20, 21 and 22 to contacts 6, 7, 8 and 9.

Relay 15 closes a circuit when energized, through its armature 23 from conductor 24 of a power line, through its front contact, conductor 25 through the motor 5 to the other power supply conductor 26, causing motor 5 to rotate disc 2 in counter clockwise direction.

Relay 16, closes a circuit when energized, through its armature 27, from supply conductor 24, conductor 28, motor 5, and conductor 26, causing motor 5 to rotate disc 2 in a clockwise direction.

Relay 17 closes a circuit, when energized, through its armature 29 from line conductor 30, conductor 31, motor 32, and line conductor 33 causing rotation of motor 32 in one direction. Relay 18 controls a circuit through its armature 34 from line conductor 30, conductor 35, motor 32 and line conductor 33, causing a reverse rotation of motor 32. Motor 32 may operate a valve or the like.

With the parts in the position shown in Figure 1, the system is balanced and no movement of the motors occur. In order to illustrate the operations, it will be assumed that the temperature deviates from a predetermined value as for example drops below the desired value. As a result of this drop in temperature, arm 1 is shifted into engagement with contact 6 on disc 2 in any well known manner as illustrated in the above mentioned application.

Upon engagement of contact 6 by arm 1, an energizing circuit is completed for magnet 15 which in turn closes the circuit for motor 5 through armature 23. Motor 5 will now rotate disc 2 counter-clockwise carrying contact 6 into engagement with contact 8 and completing the circuit to energize magnet 17. Energization of magnet 17 closes the circuit for motor 32, causing rotation of the valve (not shown) controlled by motor 32 in a direction to increase the rate of fuel supply.

The rotation of motor 5 will continue until the contact 6 is disengaged from arm 1, breaking the circuits of magnets 15 and 17. This, it will be noted, depends on the extent of movement of arm 1. If there has been a wide deviation of the temperature from normal, the arm 1 will move a considerable distance over contact 6 and the above described circuits for magnets 15 and 17 will remain closed for a comparatively long time before the disc 2 is rotated a sufficient distance to break the circuit. On the other hand, should the temperature variations be slight, arm 1 will engage the lower edge of contact 6 and the circuits will be broken shortly after motor 5 starts rotating the disc.

Magnets 15 and 17 will then be deenergized opening the circuits of motors 5 and 32, respectively and stopping the rotation thereof.

The rate of fuel supply will now be changed but until the temperature responds to this change, contact 6, will remain in engagement with contact 8. As the temperature responds, arm 1 will move back to its normal position shown and will engage contact 7 which is now in the neutral position of arm 1 due to the rotations of disc 2. This completes the circuit for magnet or switch 16 which will energize and close the circuit for motor 5 through its armature 27 for rotating the motor in the reverse direction from that described above which rotates disc 2 clockwise.

This rotation of motor 5 will continue while motor 32 remains at rest until the disc 2 is restored to the position shown. If the temperature does not continue to rise after it has reached its predetermined value, the arm 1 will remain in its neutral position and as disc 2 is restored to its neutral position, the circuit for magnet 16 is broken and in time the motor circuit is opened. Motor 5 therefore comes to a stop.

If, however, the temperature continues to rise and arm 1 is moved to follow in engagement with contact 7, the circuit for magnet 16 continues closed and the motor 5 continues to rotate. When this occurs disc 2 will be rotated to the position where contact 7 will engage fixed contact 9 causing energization of magnet 18 and a reversal of rotation of motor 32. The reversal of motor 32 will continue until contact 9 is disengaged from arm 1 and will through operation of the fuel supply valves, decrease the rate of fuel supply, with the resultant drop in temperature causing an upward movement of arm 1.

It will be noted that motor 32 will be operated step by step and the length of the steps or intervals of rotation varying with the extent of deflection of arm 1 from the balanced or zero position. The amount of fuel supply correction made through the valves by motor 32 will accordingly vary with the amount of deviation in temperature from the desired value. By causing each step to apply a correction in proportions sufficient to bring the arm 1 back to the zero position, the desired temperature may be closely maintained. It should be noted that due to the rotation of disc 2, the same deviation of arm 1 will produce different changes in the fuel supply depending on whether the arm is moving towards or away from the neutral position. With the parts as shown, a predetermined deviation of the temperature will cause a fixed operation of motor 32. Due, however, to the rotation of disc 2, the circuit for motor 32 will be broken earlier and the change in fuel supply stopped sooner although arm 1 is still in the same deflected position while the arm is returning towards normal than is the case while the arm 1 is moving from normal.

Although magnets 15 and 16 are shown controlling motor 5, it is obvious that they may be arranged to control the fuel supply valve in conjunction with motor 32. Motor 32 itself may be under control of these two magnets or motor 5 can also be arranged to control the valves. Since the operation of magnets 15 and 16 are dependent not only on the extent of deflection of arm 1 but also its direction of movement, a selective control is thus obtained which depends not only on the extent of temperature variations but also upon whether the temperature is rising or falling.

Although relays have been indicated to control the motor circuits, it will be understood that any well known arrangement of electromagnetic switches may be utilized or in case small motors are employed, the circuits may be completed directly by arm 1 without the utilization of relaying apparatus. It will also be understood that arm 1 may be actuated by a galvanometer arrangement controlled by temperature or pressure variations in a furnace and that various forms of reversing motors are adaptable for use in the system.

In processes where the response to change in fuel supply is rapid, as in the case of comparatively small furnaces, a simplified control arrangement may be utilized. Such an arrangement is shown in Figure 2. The motor 5 and rotating disc 2 are eliminated and magnets or switches 17 and 18 control motor 32 in the manner set forth to regulate the rate of fuel supply. Fixed contacts 8 and 9 are adapted to be engaged by arm 1 which will complete circuits from battery 13' to relay 17 or 18 depending upon whether contact 8 or 9 is engaged. Arm 1 may be actuated in any convenient manner as by temperature or by pressure variations referred to above.

As shown, arm 1 is secured to a pivotally movable coil 36 of a galvanometer and is arranged for movement between the magnetic poles 37 and 38. The coil 36 may be actuated by a spring tending to urge arm 1 to one side or the other. An energizing circuit for coil 36 includes battery 13 a high resistance conductor 40 and thermocouple 41. The thermocouple 41 measures a temperature in a furnace.

In operation, when a balanced condition exists the galvanometer circuit is such as will cause sufficient current to flow to hold arm 1 centrally between contacts 8 and 9 against the spring tension. A decrease in temperature will cause a decrease of current generated by the thermocouple. Arm 1 will then move under the influence of the coil spring into engagement with contact 8 causing energization of magnet 17 and a corresponding rotation of motor 32 to increase the rate of fuel supply. Motor 32 will continue to rotate until arm 1 is returned to the balanced or zero position. As in this form, the response in the furnace to the change in fuel supply is rapid when the proper temperature is obtained, arm 1 will disengage either contacts 8 and 9 and be positioned between them.

In a similar manner, when the temperature rises above the desired value, the flow of current will increase in the galvanometer circuit. Arm 1 will then engage contact 9 and cause energization of magnet 18 which will cause rotation of motor 32 to decrease the rate of fuel supply. It will be seen that as soon as any deviation of temperature occurs, motor 32 will be set into operation to restore the proper relative values.

In Figure 3, a modified form of control is disclosed for utilization where it is desired to establish a definite timing between correcting steps. This form is useful in instances where a comparatively long time elapses between a change of fuel supply and corresponding temperature effect in the furnace. A timing control is accordingly introduced. Arm 1 is secured to coil 36 and actuated by the galvanometer arrangement as set forth in connection with Figure 2.

Secured to arm 1 and properly insulated therefrom, are contacts 43 and 44. Mounted for rotation on the axis of movement of arm 1 but movable independently of arm 1 is a member 47 provided with a toothed rack extension 48 and arms 49 and 50 formed integrally therewith. Worm 4 driven by motor 5 meshes with and drives rack 48 together with arms 49 and 50.

Contacts 51 and 52 are secured to arm 49 and insulated therefrom and contacts 53 and 54 are secured to arm 50 and insulated therefrom. Contacts 55, 56, 57 and 58 are secured to fixed supports and positioned to be engaged by contacts 51, 52, 53 and 54 respectively as arms 49 and 50 are rotated to the right or left by the action of motor 5. Contacts 51 and 54 are connected by conductor 59 to one terminal of the armature winding of motor 5. Contacts 52 and 53 are connected by conductor 60 to the other terminal of motor 5.

The field terminals 61 and 62 of motor 5 are permanently connected to a source of electrical energy. Contact 55 is connected directly to one armature terminal of motor 32 by conductor 63 and contact 57 is connected by conductors 64 through contact 65 of an armature 66 to the other armature terminal of motor 32. The field of motor 32 is connected permanently to a supply of electrical energy by leads 67 and 68.

Armature 66 is pivotally mounted at 69 and is actuated by a spring 70 and a magnet 71. Magnet 71 is connected by a conductor 72 in series through armature 73 of a relay 74 and time switch 75 to the opposite poles of an electrical supply source. A rotating cam 76 or any other suitable means is utilized to periodically close switch 75. Relay 74 is connected in series in line lead 77 through an insulated contact 78 on armature 66.

Mounted on armature 66 are insulated contacts 79 and 80 which are connected to the opposite poles of a source of electrical energy by conductors 81 and 82. When magnet 71 is energized, contacts 79 and 80 will apply potential to contacts 55, and 56 and 57 and 58 through conductors 83 and 84 respectively, and contacts 65 and 78 will be open. Contacts 57 and 58 are connected to conductors 64 and 63.

In operation, cam 76 actuates switch 75 to periodically close and interrupt the energizing circuit for magnet 71. With the temperature being controlled at the proper value, arm 1 will be in the zero position shown in Figure 3. As magnet 71 is energized, contacts 65 and 78 will be interrupted and line potential will be applied to conductors 83 and 84 by contacts 79 and 80 but the energizing circuits of motors 5 and 32 are open at contacts 65 and 78 and no operation of the motors can occur.

If the temperature drops below the predetermined value, arm 1 will deflect to the right, causing contacts 43 and 44 to apply line potential to contacts 51 and 52. As soon thereafter as magnet 71 deenergizes, armature 66 will close contacts 65 and 78 and motor 5 will receive armature current over a circuit including battery conductor 45, contact 43, in engagement with contact 51, conductor 59, the motor armature and conductor 60 to contact 52, in engagement with contact 44 back to the other side of battery through relay 74 and over conductors 77a and 46. Motor 5 will rotate in a direction to move arms 49 and 50 to the right causing contacts 51 and 52 to engage contacts 55 and 56 respectively, while contacts 43 and 44 are still in engagement with contacts 51 and 52.

Energy is now supplied to motor 32 from the battery over conductor 45, contact 43, contact 51, contact 55, conductor 63, motor 32, conductor 64, contact 65, conductor 64 and contact 56, 52 and 44 to the other side of battery over conductor 46 through relay 74. Motor 32 will rotate in a direction to vary the fuel supply in any well known manner and the rotation of both motors will continue until contacts 51 and 52 are moved out of engagement with contacts 43 and 44 at which time the armature circuits of both motors will be broken.

While current flows in conductor 77a, relay 74 will be energized and will attract armature 73 to interrupt the energizing circuit of magnet 71 so that the correcting steps will be carried on without interruption by operation of the time control. After the interruption of the motor circuits, relay 74 will deenergize and contacts 51 and 52 will be in engagement with contacts 55 and 56. Upon the next closure of switch 75, magnet 71, will energize interrupting contacts 65 and 78 and closing contacts 79 and 80.

A circuit will thereupon be completed from battery to contact 79, conductor 83, contact 55, contact 51, conductor 59, motor 5, conductor 60, contact 52, contact 56, conductor 84, and contact 80 to the other side of the battery.

The current direction in this circuit will be such as to reverse the rotation of motor 5 and this rotation will continue until contacts 51 and 52 are disengaged from contacts 55 and 56 when the armature circuit will be broken and the parts will be restored to zero or balanced position for the next correction. Time switch 75 is held closed a sufficient length of time to permit complete restoration of arms 49 and 50 to normal.

While it is preferred to completely restore arms 49 and 50 to normal when time switch 75 is closed, it is possible to so operate the table 48 as to return the arms 49 and 50 to normal in a plurality of steps if desired, the essential principles of operation and the advantageous results obtained being unaffected by whether the arms 49 and 50 are returned to normal in one step or in a series of steps.

During the restoring movement, motor 32 cannot operate, as its circuit is interrupted at contact 65 when magnet 71 is actuated. If the correction to the fuel supply applied by motor 32 was not sufficient to restore the temperature to normal by the time motor 5 has completed its restoring movement and magnet 71 has deenergized, arm 1 will have adjusted itself to the changed temperature and contacts 43 and 44 will engage contacts 51 and 52 causing a repetition of the cycle of operations above set forth and further correction will occur. The cycles will be repeated until the further temperature is reached, when arm 1 will return to normal.

In a similar manner, if the temperature rises above the predetermined value, arm 1 will deflect to the left causing contacts 43 and 44 to engage contacts 53 and 54. This will complete an energizing circuit over conductors 59 and 60 in a direction opposite to that closed over contacts 51 and 52 traced above and motor 5 will rotate arms 49 and 50 to the left causing engagement of contacts 53 and 54 with contacts 57 and 58. A circuit will now be completed to 63 and 64 causing motor 32 to rotate in a direction to operate the valves to decrease the rate of fuel supply and the temperature will accordingly drop.

Rotation of motors 32 and 5 will continue until contacts 53 and 54 are disengaged from contacts 43 and 44 when the supply of energy from conductors 45 and 46 will be interrupted. As above set forth, relay 74 will deenergize during this period permitting switch 75 to complete an energizing circuit for magnet 71 at the proper time. When magnet 71 energizes a circuit for motor 5 will be closed from contacts 79 and 80 over conductors 83 and 84, contacts 57, 53, 58 and 54 conductors 59 and 60 to motor 5. Motor 5 will rotate the contacts 53 and 54 to the right until they are disengaged from contacts 57 and 58 interrupting the energizing circuit as traced. If the correction was insufficient to effect the restoration of arm 1 to zero position, the cycles will be repeated until the balance is effected.

It will be noted in this form that the extent of correction will vary with the deflection of arm 1 from the zero position, and will accordingly vary with the degree of deviation. It will also be noted that correction continues in steps until the desired conditions are restored.

As arm 1 is deflected, contacts are closed in various combinations. Thus for example, a circuit is first completed over contacts 43 and 51 and contacts 44 and 52. Thereafter a circuit is completed over contacts 43, 51 and 55, and 44, 52 and 56. By these various combinations selective operations can be obtained for controlling the valve controlling motor so as to vary the fuel supply in a manner to prevent hunting, by controlling not only in accordance with the deviations from normal but also in accordance with the direction of the fuel supply.

As illustrated, motor 5 is operated by one combination of contacts and motor 32 and 5 by another. Although motor 5 is shown as controlling only the arm 49 and 50, it is obvious that it could be operated to control the fuel supply valves in conjunction with motor 32.

This application is a division of my co-pending application, Serial No. 724,630, filed July 7, 1924, for automatic analyzing and control systems and apparatus therefor.

Although I have shown one preferred form of my invention, it is obvious that it has many other applications, as for example, pressure control or any similar control of a condition, and I do not intend to limit myself specifically to the above illustrated but only insofar as set forth in the appended claims.

I claim:

1. In combination, a device to be maintained at a predetermined temperature, energy control means, a deflecting member variably operated in accordance with the variations of temperature of said device, electromagnetic means responsive to a deflection of said deflecting member for conditioning said energy control means for operation, and means operated by said electro-magnetic means and operating in conjunction with said deflecting member for controlling said energy control means.

2. In combination, a deflecting member responsive to variations of temperature from a predetermined temperature, energy control means, said deflecting member being normally ineffective to control said energy control means, electro-magnetic means operated in response to the deflection of said deflecting member for rendering said deflecting member effective to control said energy control means, said electro-magnetic means being thereafter operative in response to the deflection of the deflecting member for again rendering said deflecting member non-operative.

3. In combination, a deflecting member, energy control means, an electric circuit for controlling said energy control means, said deflecting member being arranged when deflected to a predetermined extent to close said electric circuit to operate said energy control means and means operative in response to the operation of said deflecting member for rendering said deflecting member ineffective to close said circuit when in its deflected position.

4. In combination, a deflecting member, energy control means, said deflecting member being normally ineffective when deflected to control said energy control means, means operative in response to the deflection of said deflecting member for rendering said deflecting member effective to control said energy control means, periodically operated means for operating said last mentioned means to again render said deflecting member ineffective said periodically operating means being rendered ineffective when said deflecting member is rendered effective.

5. In a control apparatus, a deflecting member comprising a pair of contacts, a control circuit including a pair of contacts and a pair of intermediate contacts disposed between said deflecting member contacts and said control circuit contacts, means operative in response to a deflection of said deflecting member for moving said pair of contacts disposed between said deflecting member and control contacts to bridge said deflecting member contacts and control contacts, whereby said control circuit is operated in accordance with the extent of deflection of said deflecting member, said intermediate contacts upon further operation in response to the deflection of said deflecting member disengaging said deflecting member contacts from said control contacts, and means ineffective while said intermediate contacts bridge said deflecting member contacts and control contacts and effective following the disengagement of said contacts for restoring said intermediate contacts to their original position.

6. In a control apparatus, a deflecting member including a pair of contacts, a pair of control contacts, a pair of intermediate contacts, disposed between said deflecting member contacts and said control contacts, means responsive to a deflection of said deflecting member for moving said intermediate contacts to bridge the deflecting member contacts and said control contacts for an interval of time and upon further movement of said intermediate member to disengage said contacts and means operative following the disengagement of said deflecting member contacts and said control contacts after engagement for moving said intermediate contacts back to their original position.

7. In a control system, a deflecting member, a control member arranged to be operated in accordance with the extent of deflection of said deflecting member and means operative in response to the deflection of said deflecting member for first rendering said deflecting member effective to operate said control and thereafter rendering said deflecting member ineffective.

8. In a control apparatus, a deflecting member, operated in accordance with the variations of temperature from a predetermined temperature, said deflecting member upon deflection being ineffective and means operated in response to the deflection of said deflecting member for rendering said deflecting member effective after an interval of time to perform control operations in accordance with the extent of deflection of said deflecting member, said means being operative after a further interval of time in accordance with the extent of deflection of said deflecting member for thereafter again rendering said deflecting member ineffective.

9. In combination, means responsive to a departure of a measurable condition from a predetermined value, a plurality of circuits, means for controlling certain of said circuits in accordance with the extent of departure of said condition from a predetermined value, means for controlling other of said circuits in accordance with the direction of change of said condition from or to said predetermined value, and control mechanism operated in response to the combined effects of said circuits.

10. In combination, means responsive to a departure of a measurable condition from a predetermined value, a plurality of circuits, means for closing certain of said circuits in accordance with the extent of departure of said condition from a predetermined value, means for controlling other of said circuits in accordance with the direction of change of said condition from or to said predetermined value and control mechanism operated in response to the combined effects of said circuits.

11. In combination, means responsive to the departure of a measurable condition from a predetermined value, a plurality of contacts, means for selectively closing certain of said contacts, in accordance with the departure of said conditions from a predetermined value, said means being operated to selectively close other of said contacts in accordance with the direction of change of said condition, from or to said predetermined condition and control mechanism operated in response to the combined effects of the contacts closed.

12. In combination, a device to be maintained at a predetermined temperature, a deflecting member operated in accordance with variations in said temperature, a plurality of circuits, means including said deflecting member for selectively operating said circuits in accordance with the direction of movement of the temperature from or toward a predetermined value and energy supply control means operated in accordance with the circuits operated for controlling the supply of energy to said device to restore said device to said predetermined temperature value.

13. An automatic control system having a deflectable member, control elements actuable by said member, means for moving the elements to follow the deflections of the member upon such actuation, control effecting means operable by simultaneous coaction between the control effecting means, the control elements and the member.

14. An automatic control system having a deflectable member, control elements actuable by said member, means operated by said actuation for moving the elements to follow the deflection of the member control effecting means operable by simultaneous coaction between the control effecting means, the control elements and the member, the extent of operation of the control effecting means being in accordance with the extent of deflection of the member.

15. An automatic control system having a deflectable member which normally occupies a neutral position, control effecting means operable by deflection of the member from neutral position, the extent of operation of the control effecting means being proportional to the deflection, means whereby the operation of the control effecting means by the member during movement of the member toward neutral position is prevented, and additional means for operating the control effecting means so long as the member is off neutral.

16. An automatic control system having a deflectable member which normally occupies a neutral position, control effecting means operable by deflection of the member from neutral position, means whereby the operation of the control effecting means by the member during movement of the member toward neutral position is prevented, and means for operating the control effecting means so long as the member is off neutral.

17. A control system having a movable index normally occupying a neutral position, first contacts engageable by the index, electrical means operated by engagement between the member and first contacts to move the first contacts to follow the index, second contacts engageable by the first contacts, a control effecting circuit energized only when the member, first contacts, and second contacts are in engagement.

18. A control system having a movable index normally occupying a neutral position, first contacts engageable by the index, electrical means operated by engagement between the member and first contacts to move the first contacts to follow the index, second contacts engageable by the first contacts, a control effecting circuit energized only when the member, first contacts, and second contacts are in engagement, and means intermittently operating the electrical means to operate the index to neutral position so long as the first contacts and the second contacts are in engagement.

In testimony whereof I affix my signature.

ARCHIBALD C. HARRISON.